(12) United States Patent
Lin et al.

(10) Patent No.: US 10,204,204 B2
(45) Date of Patent: Feb. 12, 2019

(54) ENTRY FINDER FOR SINGLE LAYER DIFFERENTIAL GROUP ROUTING

(71) Applicant: Synopsys, Inc., Mountain View, CA (US)

(72) Inventors: Jessica Lin, Mountain View, CA (US); Ming-Jen Yang, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 112 days.

(21) Appl. No.: 15/419,566

(22) Filed: Jan. 30, 2017

(65) Prior Publication Data

US 2017/0220724 A1   Aug. 3, 2017

Related U.S. Application Data

(60) Provisional application No. 62/289,173, filed on Jan. 29, 2016.

(51) Int. Cl.
*G06F 17/50* (2006.01)

(52) U.S. Cl.
CPC ...... *G06F 17/5077* (2013.01); *G06F 2217/40* (2013.01)

(58) Field of Classification Search
CPC .................................................. G06F 17/5077
USPC ......................................... 716/126, 129, 130
See application file for complete search history.

(56) References Cited

U.S. PATENT DOCUMENTS

| | | | |
|---|---|---|---|
| 6,766,502 B1 * | 7/2004 | Pyo et al. | G06F 17/5077 716/129 |
| 7,013,451 B1 * | 3/2006 | Teig et al. | G06F 17/5077 716/129 |

* cited by examiner

*Primary Examiner* — Sun Lin
(74) *Attorney, Agent, or Firm* — Alston & Bird LLP

(57) ABSTRACT

A method, apparatus and computer program products are provided for determining an entry finder from a plurality of merge points of a bounding box for an optimal performance of a differential group pattern match routing. One example method includes identifying each merge point candidate of a plurality of merge point candidates, performing a routability determination process, results of the routability determination process comprises a remaining subset of the plurality of merge point candidates, routing each remaining merge point from the remaining subset of the plurality of merge point candidates, calculating a routing cost for each remaining merge point from the remaining subset of the plurality of merge point candidates, and determining a merge point having a lowest calculated routing cost.

24 Claims, 22 Drawing Sheets

ENTRY FINDER FOR SINGLE LAYER DIFFERENTIAL GROUP ROUTING

CROSS-REFERENCE TO RELATED APPLICATIONS

This application claims benefit under 35 USC 119 (e) of U.S. provisional Application No. 62/289,173, filed Jan. 29, 2016, the entire content of which is incorporated herein by reference.

TECHNOLOGICAL FIELD

Example embodiments of the present invention relate generally to routing on a flip-chip design and, more particularly, to differential group pattern match routing.

BACKGROUND

As technology has advanced, a trend has developed to place an increasingly large number of IO signals on a chip. To handle the large number of IO signals, an increased number of designers are using the flip-chip design as a solution. Embodiments of the present invention are directed to special routing on the flip-chip design.

In a typical flip-chip design, there are many bump IO pins placed in the middle of the chip, and the IO pad cells are placed peripherally around the chip. To connect the bump pins with the IO cell pins, usually stack vias are dropped on the IO pin to the upper layer and then router route from the vias to the bump pins. The layer used to do the routing is called a redistribution layer (RDL), and the routing is called RDL routing. FIG. 1 shows an example diagram of a flip-chip design.

For RDL routing, there are different requirements for the nets. One of the requirements is the differential group routing. There are two types of differential group routing; one is length matching and the other is pattern matching. FIG. 2 illustrates a diagram exemplifying length matching and pattern matching. For a group of multiple special signal nets, it is required that the resistance or impedance matches, thus length matching can achieve this goal. For some other more sensitive signal groups, besides the length needing to match, it may also be required to have pattern matching, such that during signal transition, electromagnetic noise can be further reduced. Embodiments described herein are directed to differential group routing with pattern match for RDL routing.

Problem

In differential group pattern match routing, a good result may be defined as a one where the length that the signals run together (e.g., side by side) as long as possible, and the routing distance variation to each pin after diversion is as small as possible. FIG. 3 is an example diagram showing a pattern match with merge points. As shown in FIG. 3, the routing runs side by side from merge point to merge point and then diverges at the merge point to connect to the pins. Therefore, in order to achieve the goal of having the signals run together side by side as long as possible with the routing distance variation to each pin after diversion as small as possible, optimal locations for the merge points must be determined. The process of finding the optimal locations for the merge points as the "entry finder".

For example, for a net group of four nets, if the net assignment is as shown in FIG. 4, there can be a multiple of solutions for the merge points. For the IO pins, which line up in a row, a good merge point is simple to find. However, for the bump pins which are not in a line, the merge point finding is not as straight forward.

If the merge point location is shown as in FIG. 5, then the routing result is shown as in FIG. 6. And in this result, there is a net which needs to "detour", increasing the routing distance variation and, thus, generating a less than optimal result.

If the merge point location is shown as in FIG. 7, then the routing result is as shown as in FIG. 8. In this result, the routing distance variation is much smaller than the previous one.

When the merge location is further moved inside the bounding box of the bump pins, as shown in FIG. 9, the routing result is even better, given that the length of matching portion is longer than previous results and the routing distance variation of the diverged portion is smaller, for example, as shown in FIG. 10.

BRIEF SUMMARY OF EXEMPLARY EMBODIMENTS

A method, apparatus and computer program product are therefore provided according to example embodiments of the present invention method for determining an entry finder from a plurality of merge points of a bounding box for optimal performance of differential group pattern match routing.

Embodiments described herein may include a routability determination process, for example configured to filter out the unroutable merge points very quickly, which may save time. Embodiments may also comprise a controllable cost function to measure the routing quality of each routing result using different merge points, enabling the identification of the optimal (e.g., best) merge point and routing solution.

In some embodiments, a method may be provided for determining an entry finder from a plurality of merge points of a bounding box for optimal performance of differential group pattern match routing, the method comprising identifying each of a plurality of merge point candidates, performing a routability determination process, the results of the routability determination process comprising a remaining subset of the plurality of merge point candidates, routing each remaining merge point from the remaining subset of the plurality of merge point candidates, calculating a routing cost for each remaining merge point from the remaining subset of the plurality of merge point candidates, and determining a merge point having a lowest calculated cost. In some embodiments, the method may further comprise removing from consideration any merge point candidate located away from bounding box.

In some embodiments, the routability determination process comprises filtering out the monotonic unroutable merge points by for each combination of bounding boxes of two nets, wherein for outer merge points, if the bounding boxes of two nets do not overlap, determining that the two nets can be both routed monotonically, and if the bounding boxes of two nets do overlap, determining whether the two nets can both be routed monotonically in accordance with a table that identifies each of six combinations of overlap, and wherein for inner merge points, determining that the two nets cannot be both routed monotonically only when the bounding boxes of the two nets cross each other.

In some embodiments, calculating the routing cost for each remaining merge point comprises calculating a cost for each remaining outer merge point from the remaining subset of the plurality of merge point candidates, calculate a cost of each remaining inner merge point from the remaining subset of the plurality of merge point candidates.

In some embodiments, an outer merge point is defined as a point located outside the bounding box of the pins and wherein the routing direction is toward the bounding box, and wherein an inner merge point is defined as a point located inside the bounding box of the pins wherein each inner merge point has four different routing directions associate with it.

In some embodiments, the cost function is cost=a merging part length*α+a diverged part length*β+a variation of diverged part length*γ wherein α, β, and γ are controllable weighting factors.

In some embodiments, an impact of a variation of the diverged part length*γ is larger than diverged part length*β, and the impact of diverged part length*β is larger than merging part length*α.

In some embodiments, a distance between a center point of two groups of pins is defined as x, and a width and a height of a bounding box of bump pins is defined as y and z, thus the merging part length has a positive relation to x and the diverged part length has a positive relation to (y+z)/2.

In some embodiments, an apparatus may be provided for determining an entry finder from a plurality of merge points of a bounding box for optimal performance of differential group pattern match routing, the apparatus comprising at least one processor and at least one memory including computer program code, the at least one memory and the computer program code configured to, with the processor, cause the apparatus to at least identify each of a plurality of merge point candidates, perform a routability determination process, the results of the routability determination process comprising a remaining subset of the plurality of merge point candidates, route each remaining merge point from the remaining subset of the plurality of merge point candidates, calculate a routing cost for each remaining merge point from the remaining subset of the plurality of merge point candidates, and determine a merge point having a lowest calculated cost. In some embodiments, the at least one memory and the computer program code are further configured to, with the processor, cause the apparatus to remove from consideration any merge point candidate located away from bounding box.

In some embodiments, the computer program code configured to perform the routability determination process further comprises computer program code further configured with the processor, cause the apparatus to filter out the monotonic unroutable merge points by for each combination of bounding boxes of two nets, wherein for outer merge points, if the bounding boxes of two nets do not overlap, determining that the two nets can be both routed monotonically, and if the bounding boxes of two nets do overlap, determining whether the two nets can both be routed monotonically in accordance with a table that identifies each of six combinations of overlap, and wherein for inner merge points, determining that the two nets cannot be both routed monotonically only when the bounding boxes of the two nets cross each other.

In some embodiments, calculating the routing cost for each remaining merge point comprises calculating a cost for each remaining outer merge point from the remaining subset of the plurality of merge point candidates, calculate a cost of each remaining inner merge point from the remaining subset of the plurality of merge point candidates.

In some embodiments, wherein an outer merge point is defined as a point located outside the bounding box of the pins and wherein the routing direction is toward the bounding box, and wherein an inner merge point is defined as a point located inside the bounding box of the pins wherein each inner merge point has four different routing directions associate with it.

In some embodiments, the cost function is cost=a merging part length*α+a diverged part length*β+a variation of diverged part length*γ wherein α, β, and γ are controllable weighting factors.

In some embodiments, an impact of a variation of the diverged part length*γ is larger than diverged part length*β, and the impact of diverged part length*β is larger than merging part length*α.

In some embodiments, a distance between a center point of two groups of pins is defined as x, and a width and a height of a bounding box of bump pins is defined as y and z, thus the merging part length has a positive relation to x and the diverged part length has a positive relation to (y+z)/2.

In some embodiments, a computer program product may be provided for determining an entry finder from a plurality of merge points of a bounding box for optimal performance of differential group pattern match routing, the computer program product comprising at least one non-transitory computer-readable storage medium having computer-executable program code instructions stored therein, the computer-executable program code instructions comprising program code instructions for identifying each of a plurality of merge point candidates, performing a routability determination process, the results of the routability determination process comprising a remaining subset of the plurality of merge point candidates, routing each remaining merge point from the remaining subset of the plurality of merge point candidates, calculating a routing cost for each remaining merge point from the remaining subset of the plurality of merge point candidates, and determining a merge point having a lowest calculated cost. In some embodiments, the computer-executable program code instructions further comprise program code instructions for removing from consideration any merge point candidate located away from bounding box.

In some embodiments, the routability determination process comprises filtering out the monotonic unroutable merge points by for each combination of bounding boxes of two nets, wherein for outer merge points, if the bounding boxes of two nets do not overlap, determining that the two nets can be both routed monotonically, and if the bounding boxes of two nets do overlap, determining whether the two nets can both be routed monotonically in accordance with a table that identifies each of six combinations of overlap, and wherein for inner merge points, determining that the two nets cannot be both routed monotonically only when the bounding boxes of the two nets cross each other.

In some embodiments, calculating the routing cost for each remaining merge point comprises calculating a cost for each remaining outer merge point from the remaining subset of the plurality of merge point candidates, calculate a cost of each remaining inner merge point from the remaining subset of the plurality of merge point candidates.

In some embodiments, an outer merge point is defined as a point located outside the bounding box of the pins and wherein the routing direction is toward the bounding box, and wherein an inner merge point is defined as a point located inside the bounding box of the pins wherein each inner merge point has four different routing directions associate with it.

In some embodiments, the cost function is cost=a merging part length*α+a diverged part length*β+a variation of diverged part length*γ wherein α, β, and γ are controllable weighting factors.

In some embodiments, an impact of a variation of the diverged part length*γ is larger than diverged part length*β, and the impact of diverged part length*β is larger than merging part length*α.

In some embodiments, a distance between a center point of two groups of pins is defined as x, and a width and a height of a bounding box of bump pins is defined as y and z, thus the merging part length has a positive relation to x and the diverged part length has a positive relation to (y+z)/2.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE SEVERAL VIEWS OF THE DRAWINGS

Figure 1:
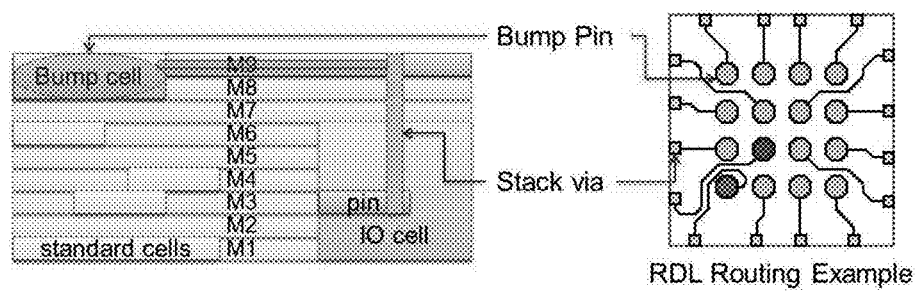
Figure 2:
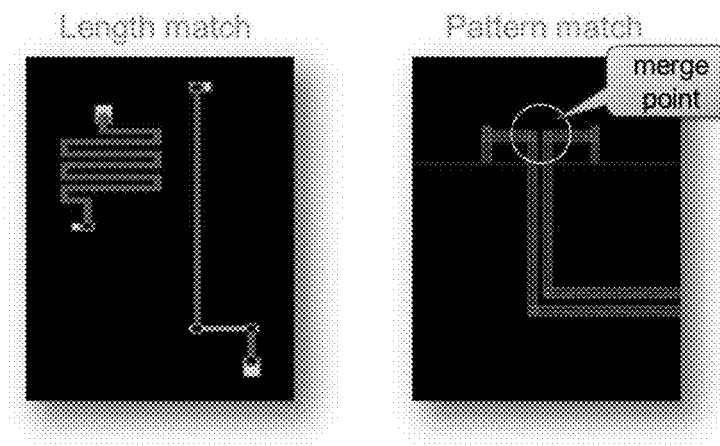
Figure 3:
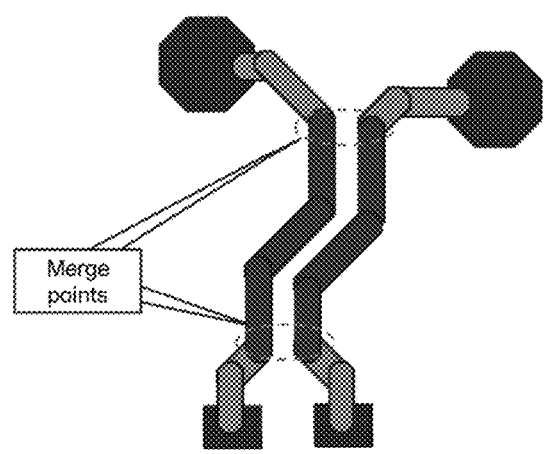
Figure 4:
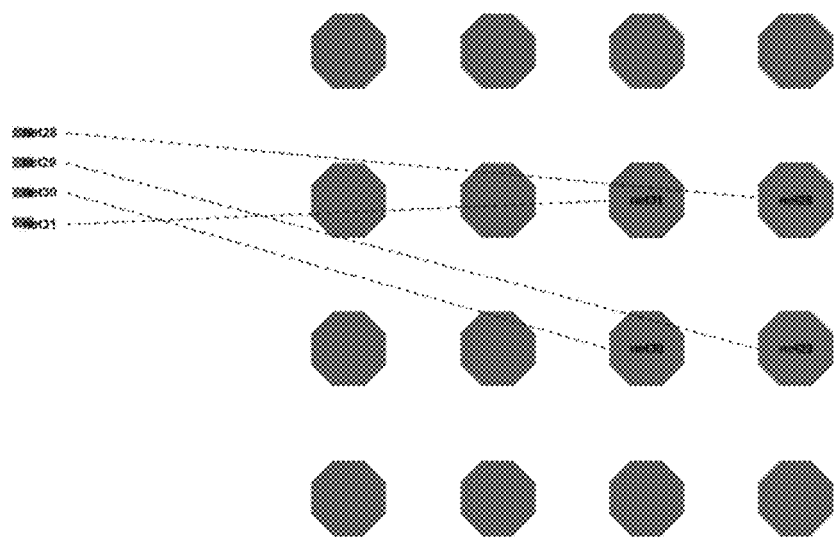
Figure 5:
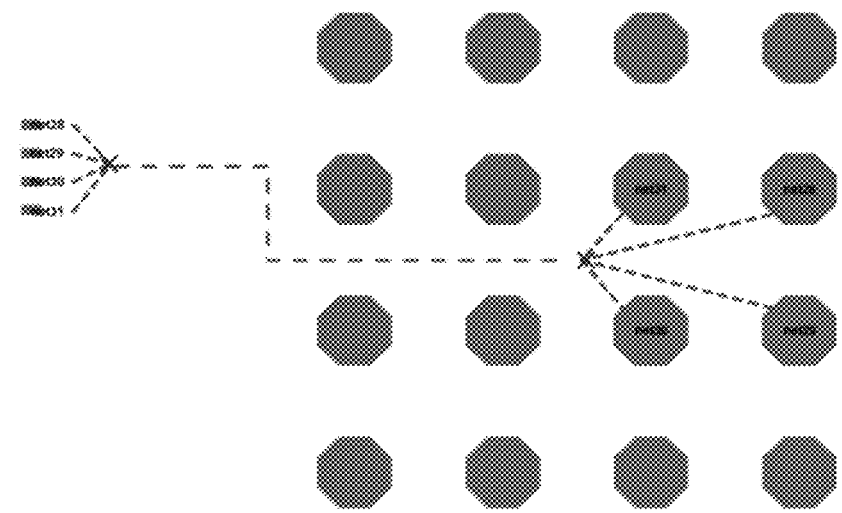
Figure 6:
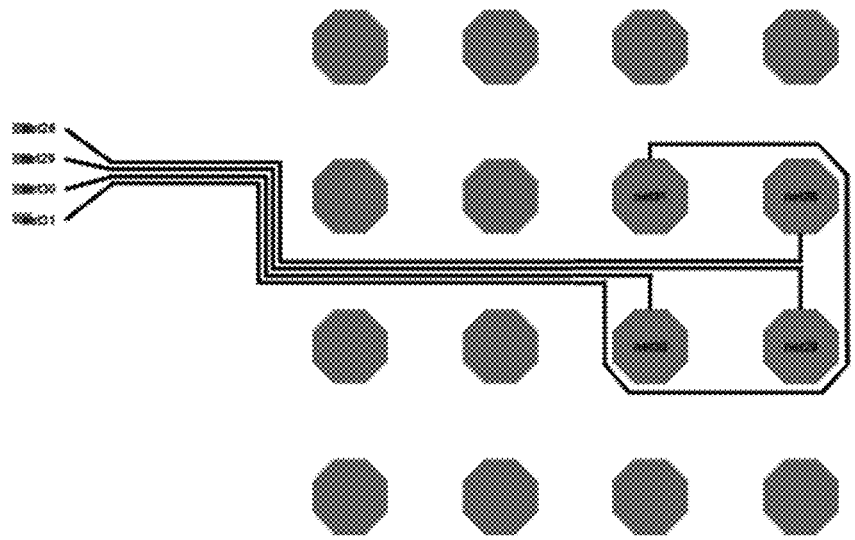
Figure 7:
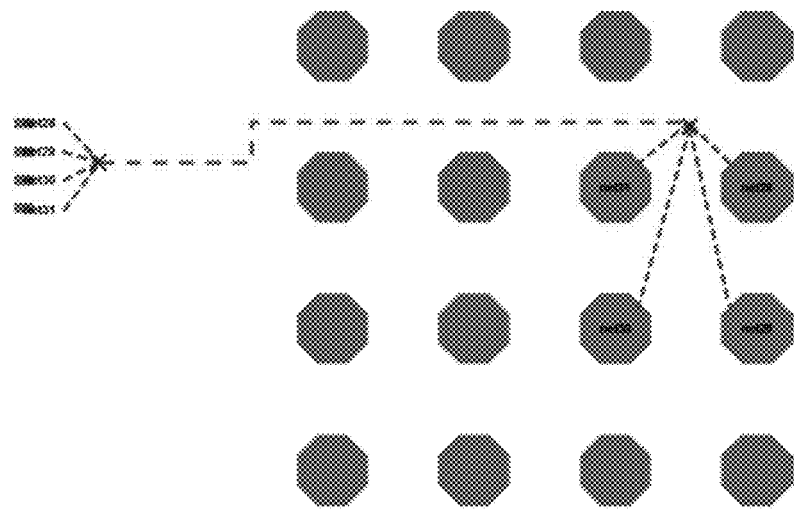
Figure 8:
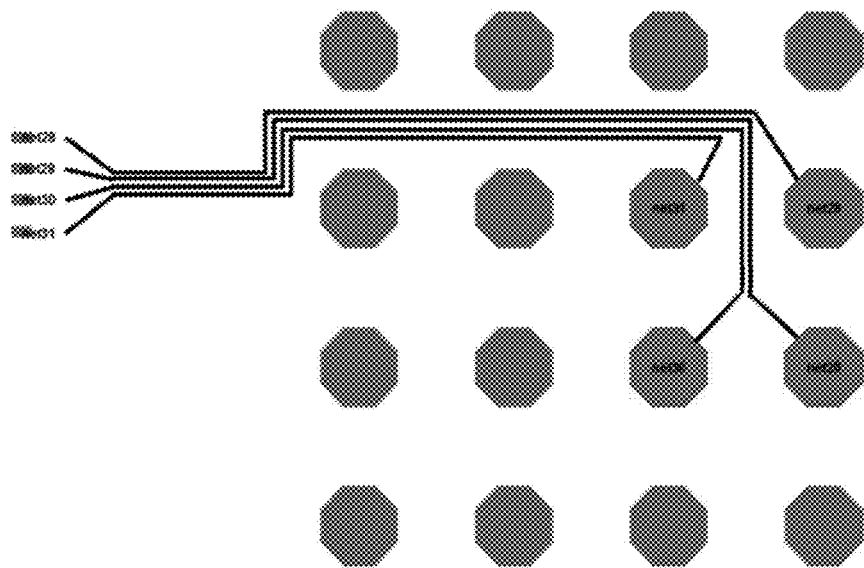
Figure 9:
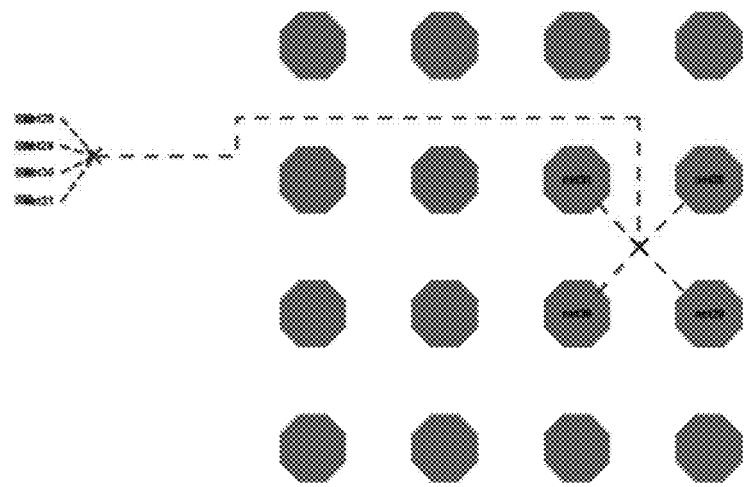
Figure 10:
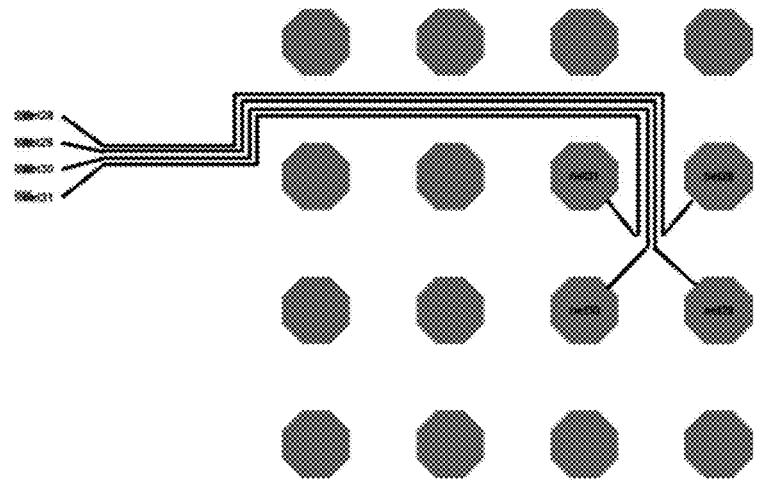
Figure 11:
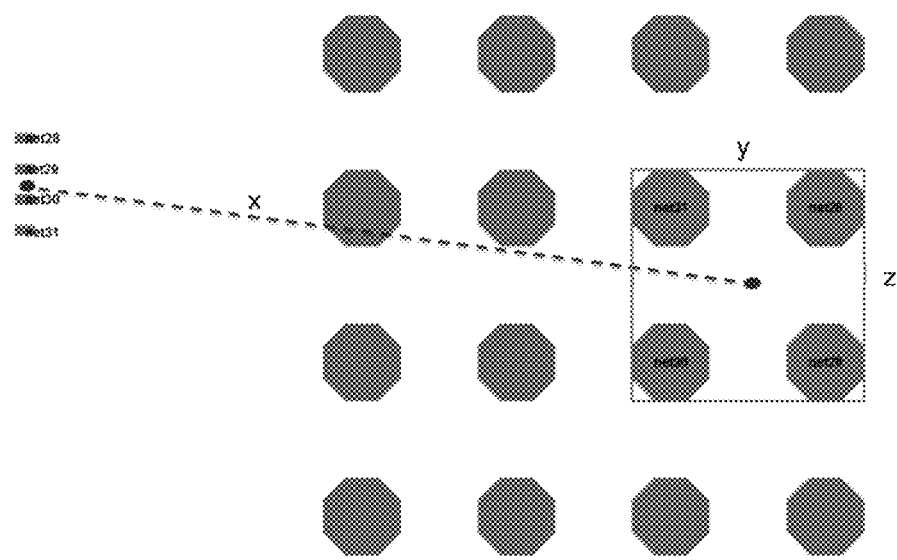

Having thus described certain example embodiments of the present disclosure in general terms, reference will now be made to the accompanying drawings, which are not necessarily drawn to scale, and wherein:

FIG. 1 illustrates a cross sectional view and an associated representation of a top view of a flip chip design integrated circuit;

FIG. 2 shows an example illustration demonstrating length and pattern matching;

FIG. 3 illustrates a representational view a pattern match example with merge points, in accordance with example embodiments of the present invention;

FIG. 4 illustrates a representational view a differential group net assignment, in accordance with example embodiments of the present invention;

FIG. 5 illustrates a representational view a first example of a location of merge points, in accordance with example embodiments of the present invention;

FIG. 6 illustrates a representational view of a routing result of the first example of merge points, in accordance with example embodiments of the present invention;

FIG. 7 illustrates a representational view a second example of a location of merge points, in accordance with example embodiments of the present invention;

FIG. 8 illustrates a representational view a routing result of the second location of merge points, in accordance with example embodiments of the present invention;

FIG. 9 illustrates a representational view a third example of a location of merge points, in accordance with example embodiments of the present invention;

FIG. 10 illustrates a representational view a routing result of the third location of merge points, in accordance with example embodiments of the present invention;

FIG. 11 is a representational view illustrating use of a weighting factor.

Figure 12:
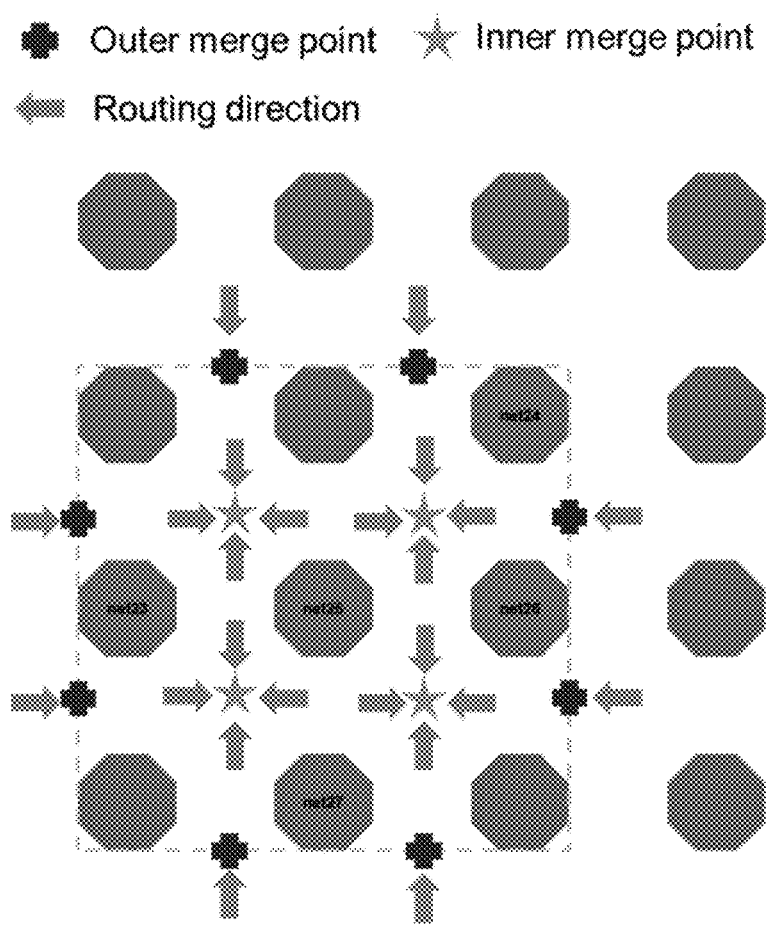

FIG. 12 is a representational view illustrating outer and inner merge points.

Figure 13:
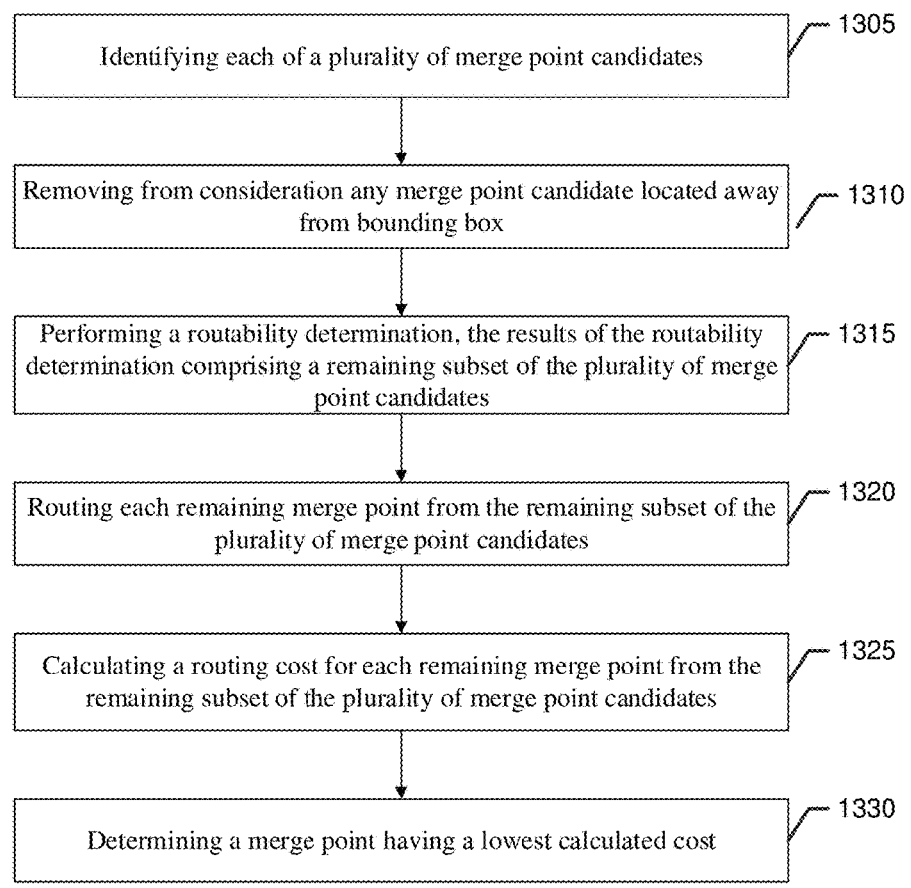
Figure 14:
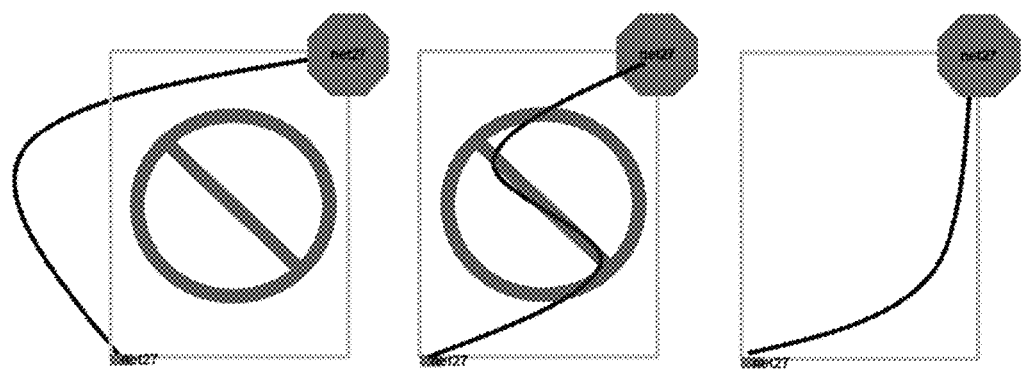

FIG. 13 illustrates a flowchart of operations performed to determine an entry finder from a plurality of merge points, in accordance with example embodiments of the present invention;

FIG. 14 is a representational view of a routing with and without detour.

Figure 15:
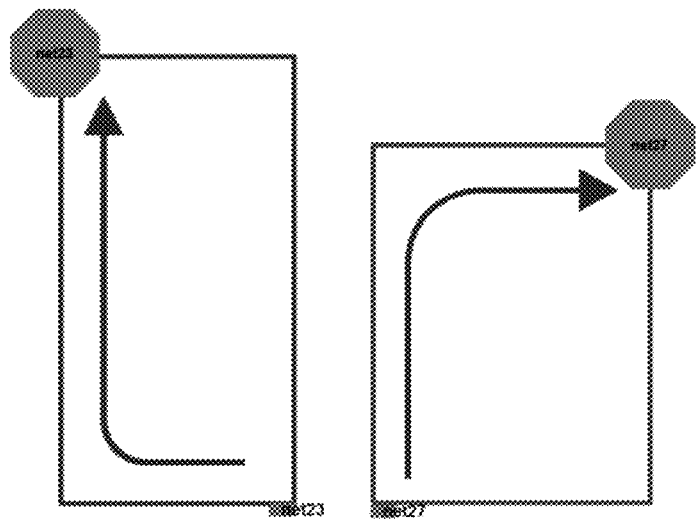

FIG. 15 is a representational view of clockwise routing.

Figure 16:
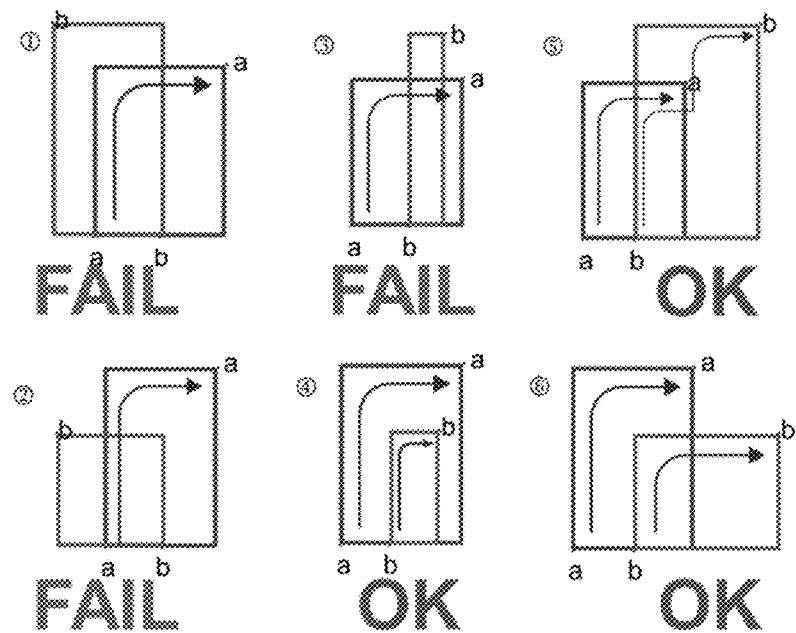

FIG. 16 shows a bounding box correlation of outer image merge points.

Figure 17:
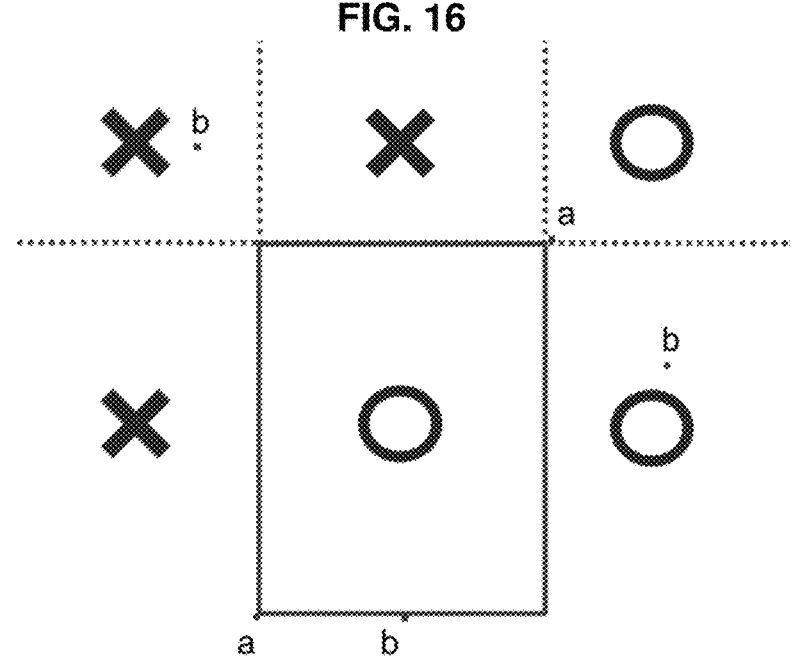

FIG. 17 is a representational view of a simplified analysis of outer merge points.

Figure 18:
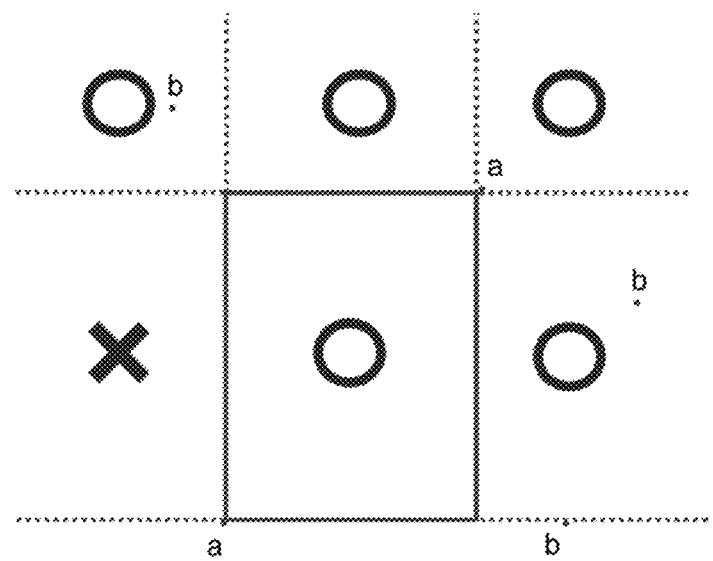

FIG. 18 is a representational view of a simplified analysis of outer merge points.

Figure 19:
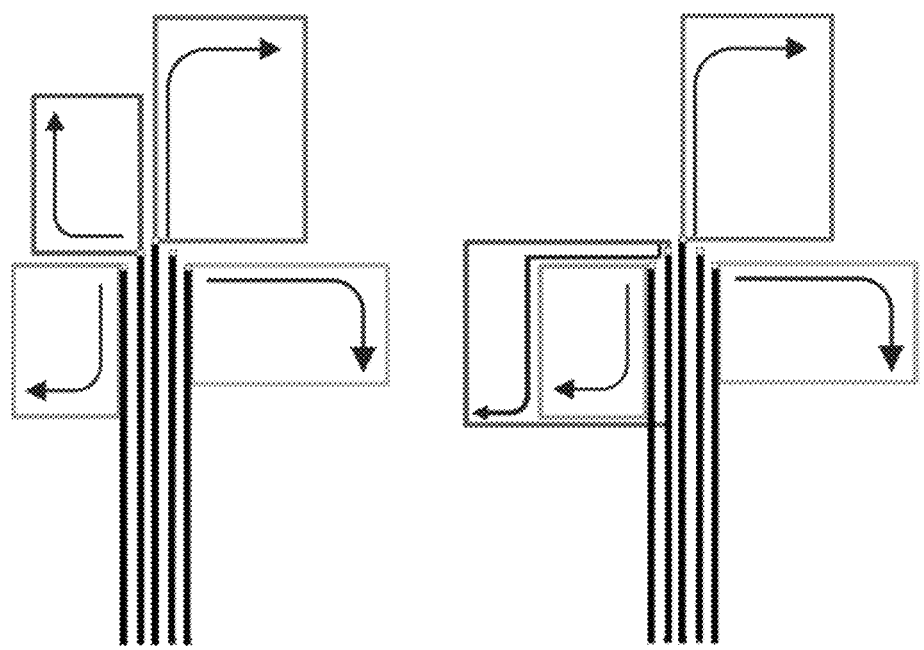

FIG. 19 is a representational view of two kinds of routing clockwise for inner merge points.

Figure 20:
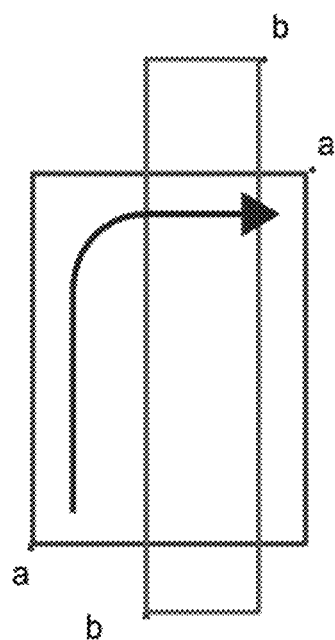

FIG. 20 is a representational view of an unroutable case of inner merge points.

Figure 21:
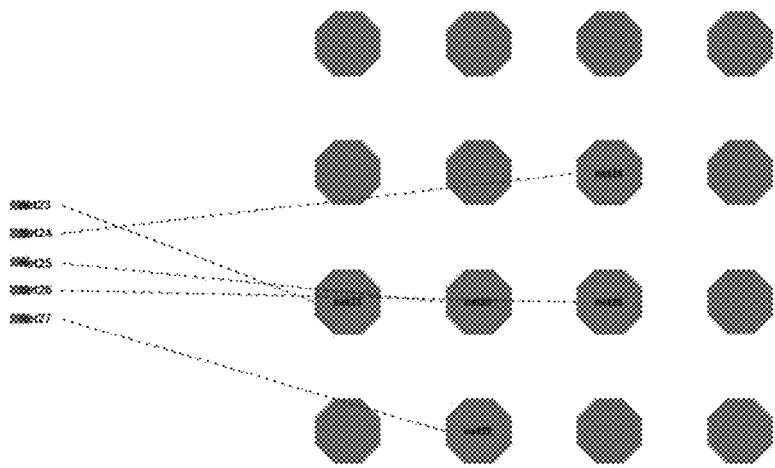

FIG. 21 is a representational view of an example of 5 nets differential group pattern match.

Figure 22:
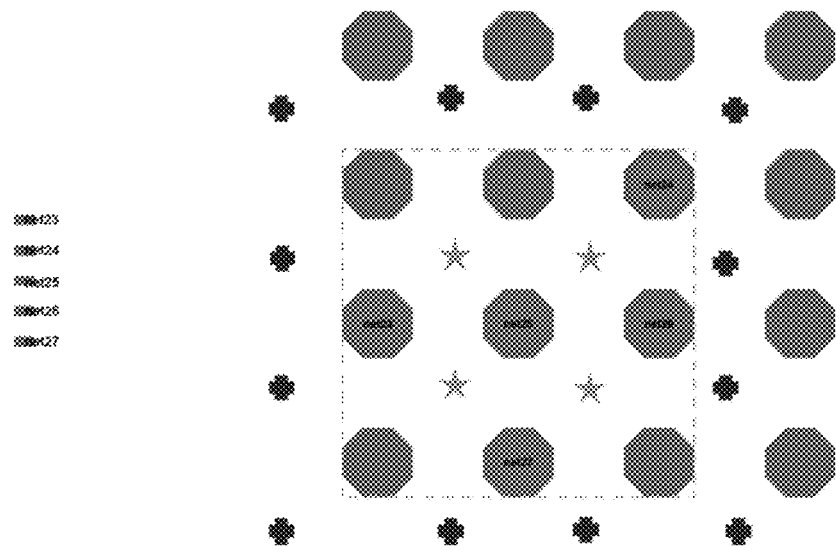

FIG. 22 is a representational view of merge point candidates.

Figure 23:
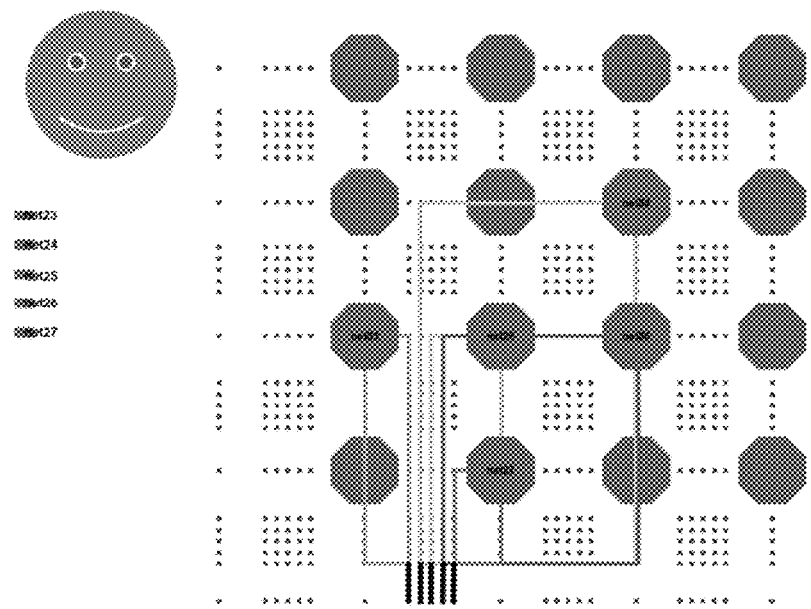

FIG. 23 is a representational view of a routability determination pass for merge point 2.

Figure 24:
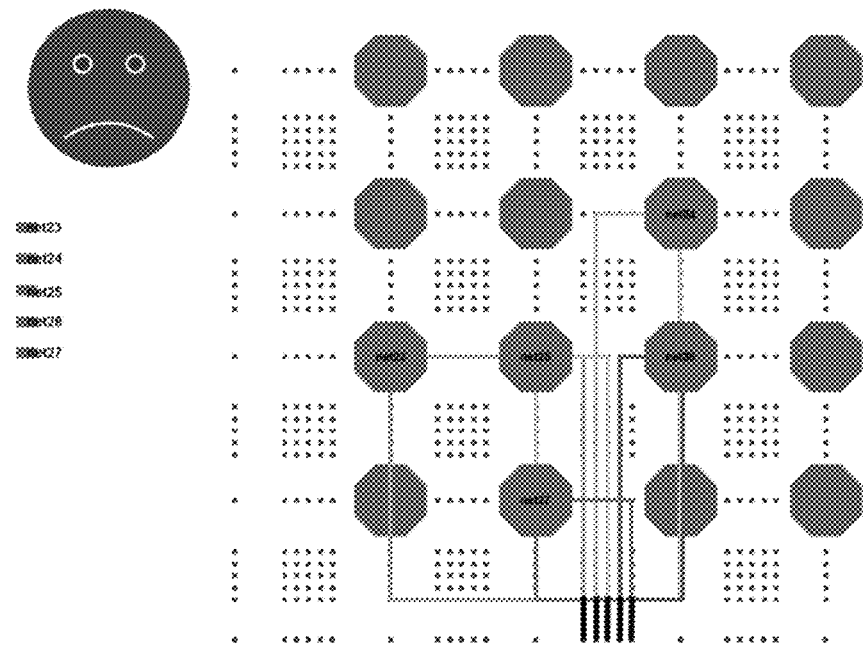

FIG. 24 is a representational view of a routability determination pass for merge point 3.

Figure 25:
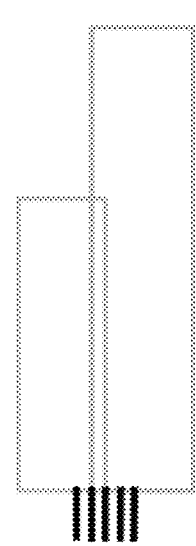

FIG. 25 is a representational view of a failed bounding box pair.

Figure 26:
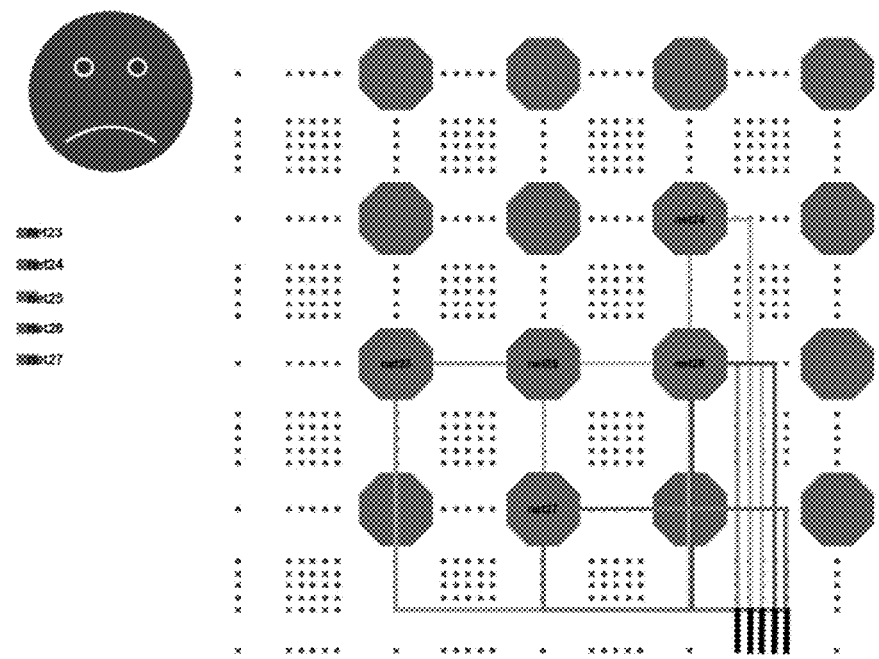

FIG. 26 is a representational view of a routability determination pass for merge point 4.

Figure 27:
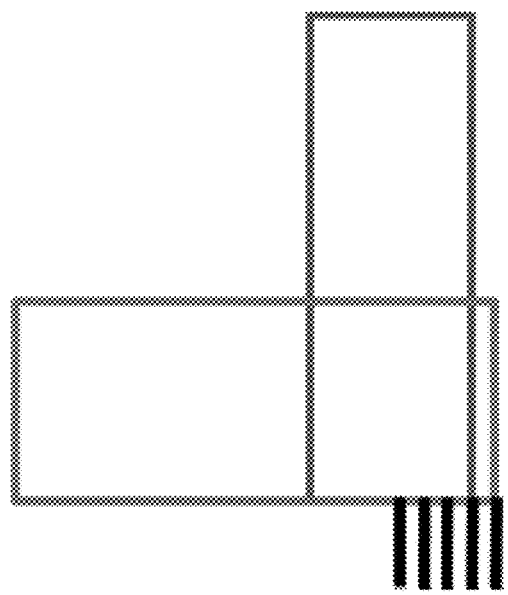

FIG. 27 is a representational view of a failed bounding box pair 2.

Figure 28:
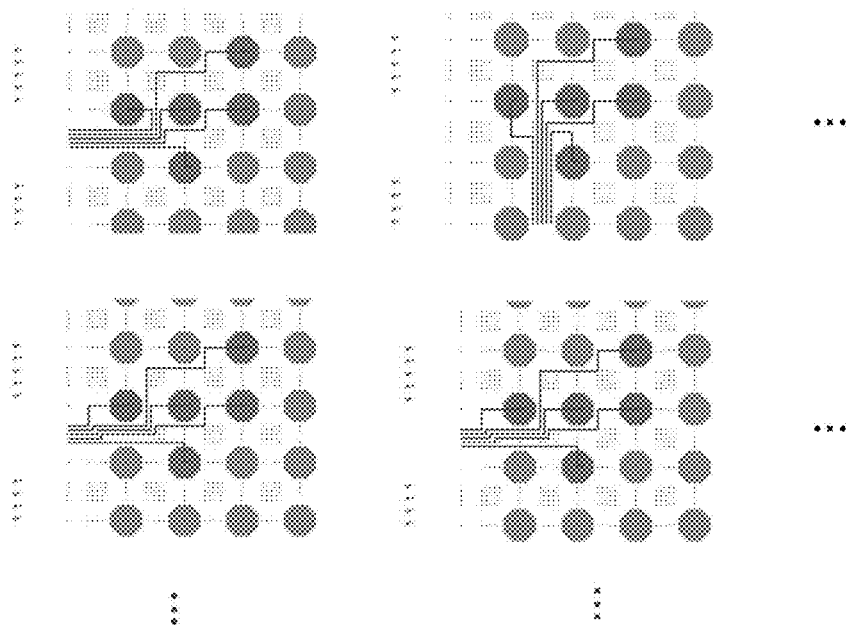

FIG. 28 shows a representational view of a process step to route all routable merge points.

Figure 29:
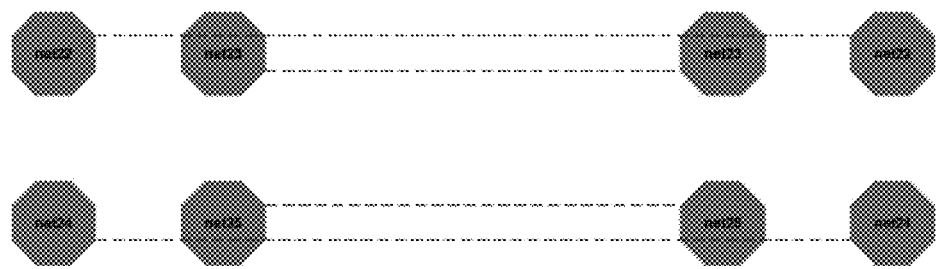

FIG. 29 shows a representational view of an example of both side of pins not placed in a line.

Figure 30:
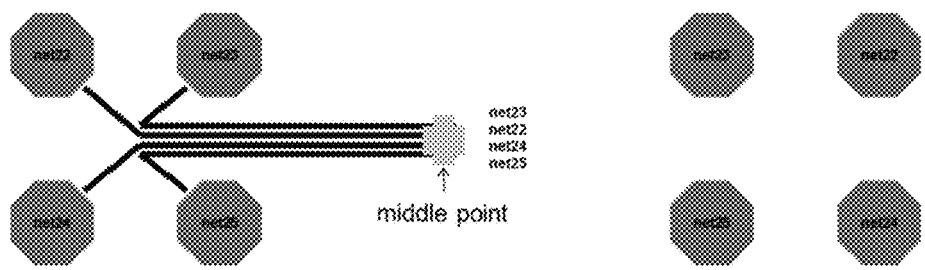

FIG. 30 shows a representational view of a possible order of the left hand side pins.

Figure 31:
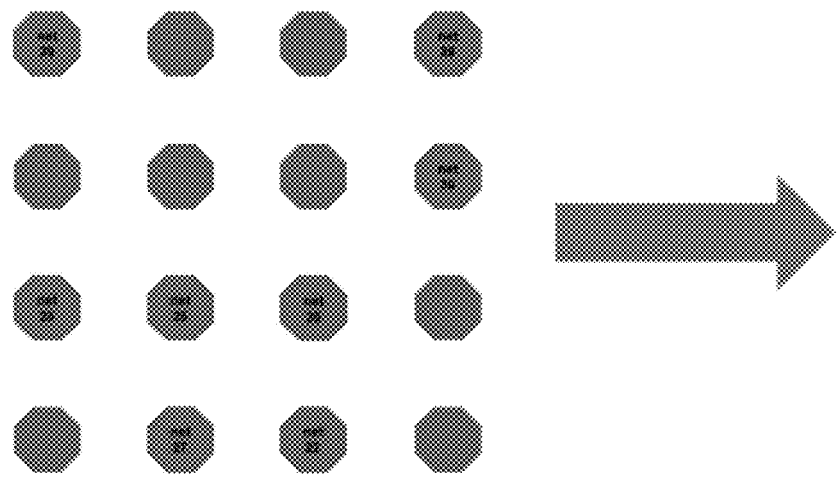

FIG. 31 shows a representational view of a complicated bump pin placement.

Figure 32:
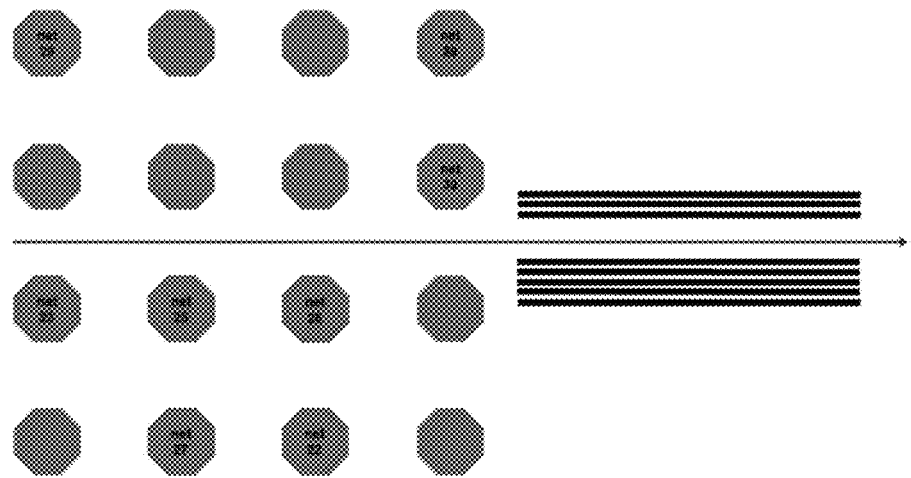

FIG. 32 shows a representational view of a method to "choose an interval as the outgoing point.

Figure 33:
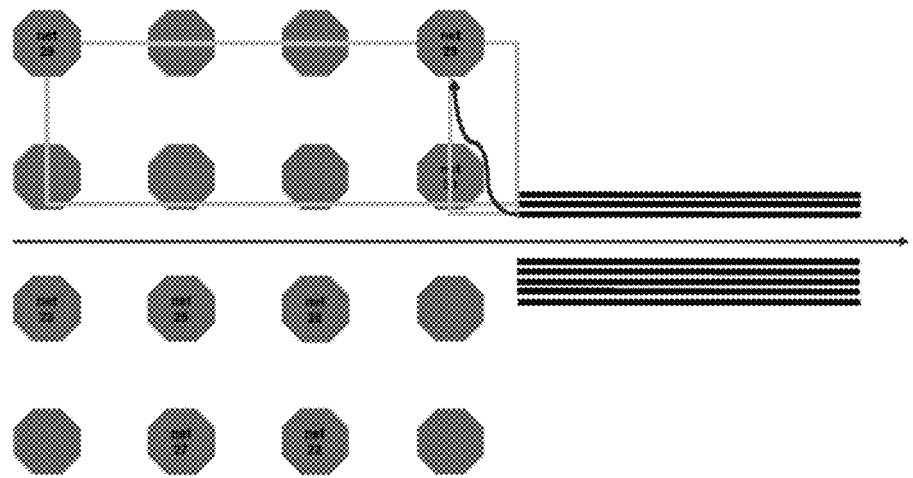

FIG. 33 shows a representational view of an example of unroutable ordering.

Figure 34:
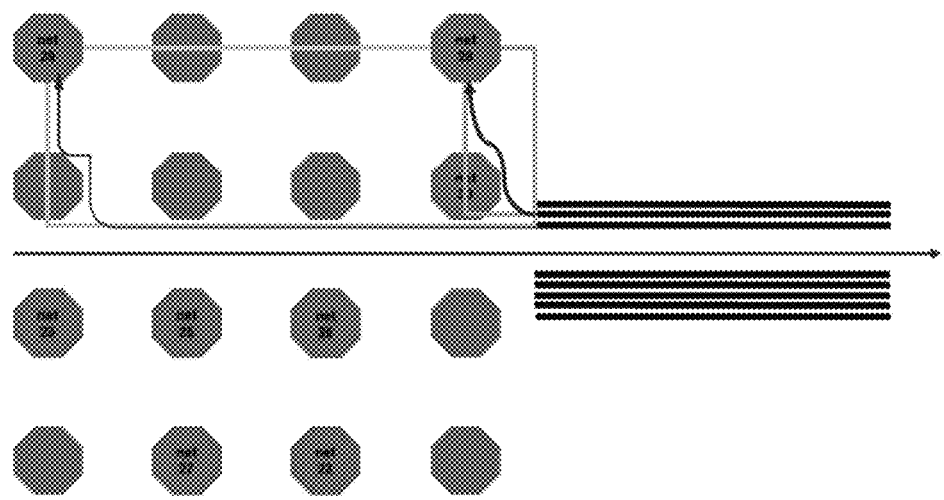

FIG. 34 shows a representational view of an example of a routable order.

Figure 35:
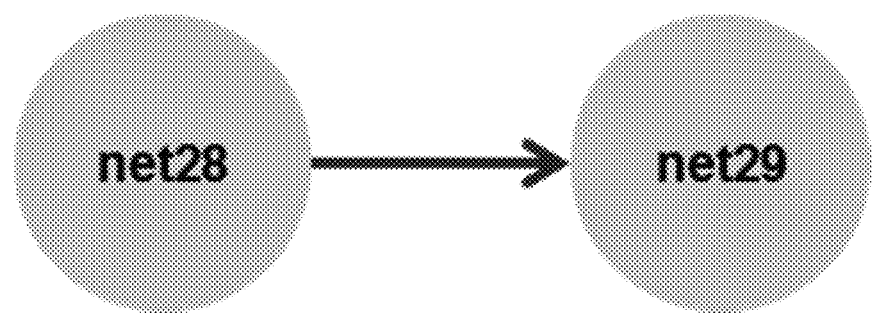

FIG. 35 shows a representational view of a constraint graph for net28 and net29.

Figure 36:
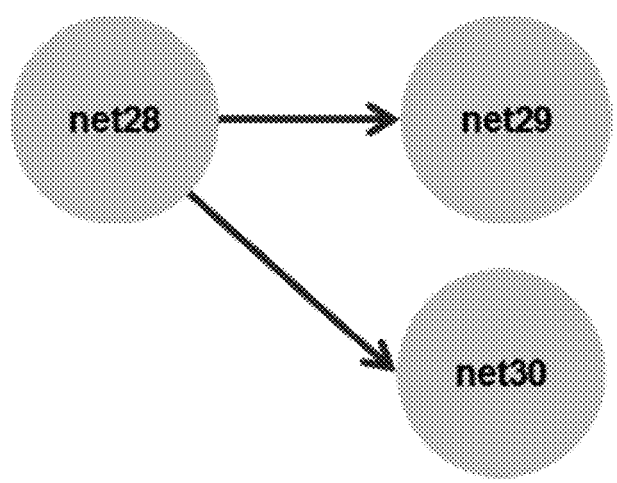

FIG. 36 shows a representational view of a constraint graph for net28, net29, and net30.

Figure 37:
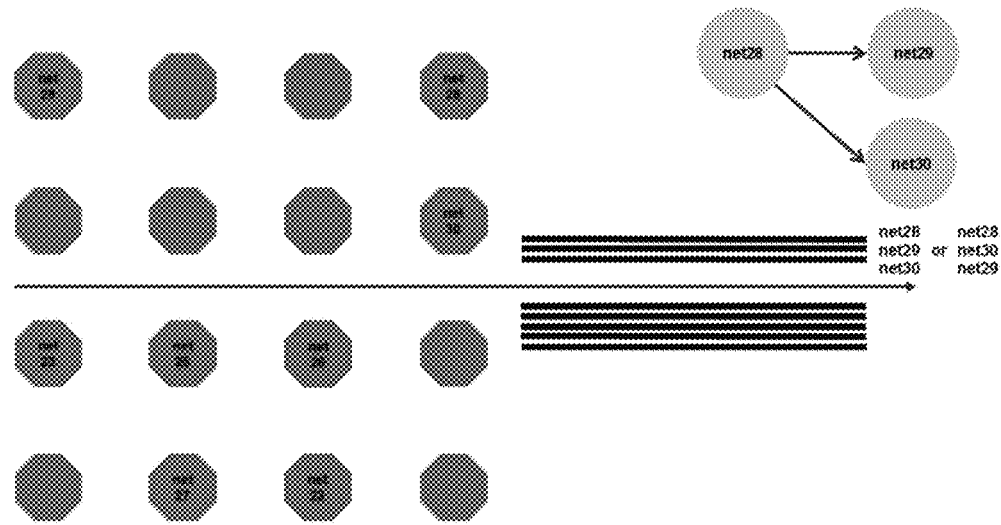

FIG. 37 shows a routing order for the upper part.

Figure 38:
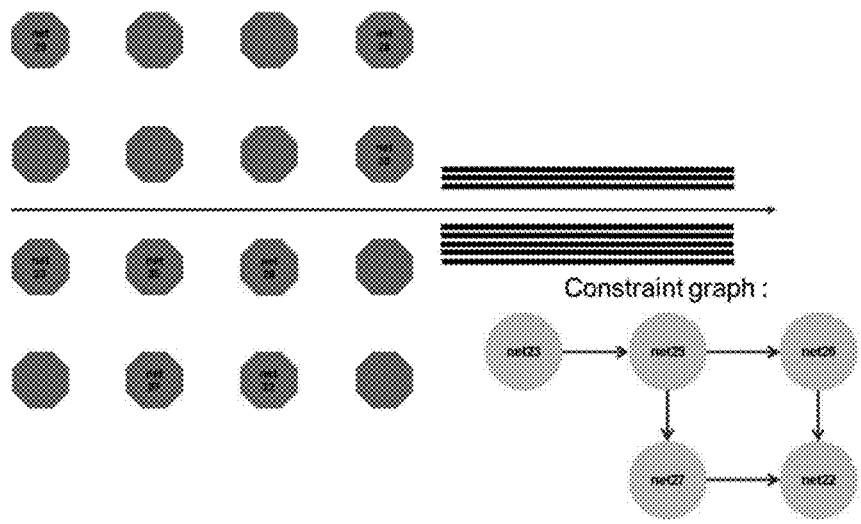

FIG. 38 shows a representational view of a routing order for the lower part.

Figure 39:
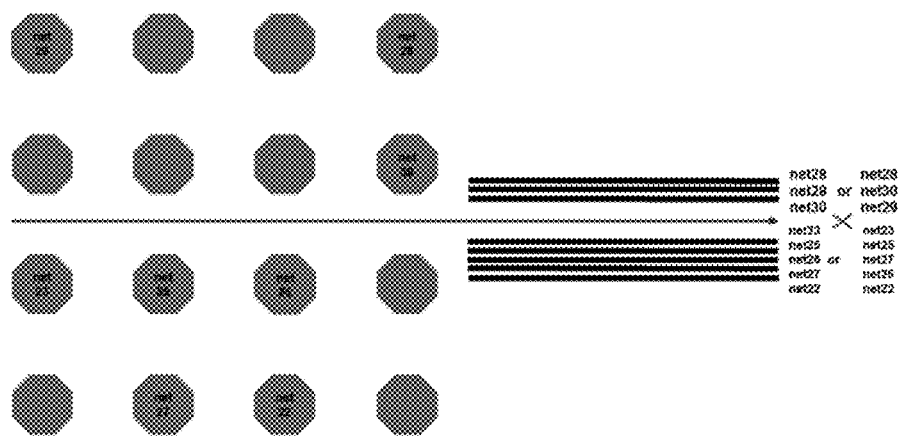

FIG. 39 shows a representational view of a total routing order.

Figure 40:
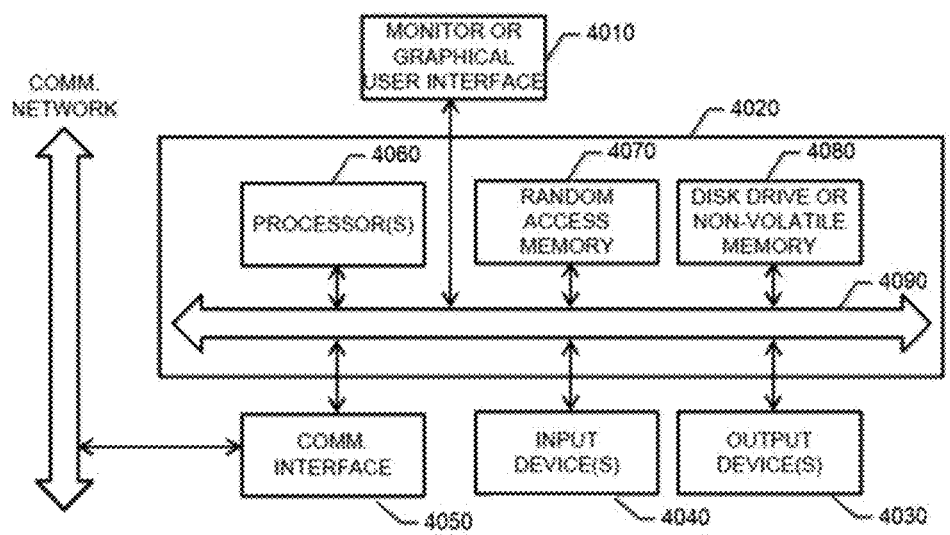

FIG. 40 is a block diagram of an apparatus that may be specifically configured in accordance with an example embodiment of the present invention.

Figure 41:
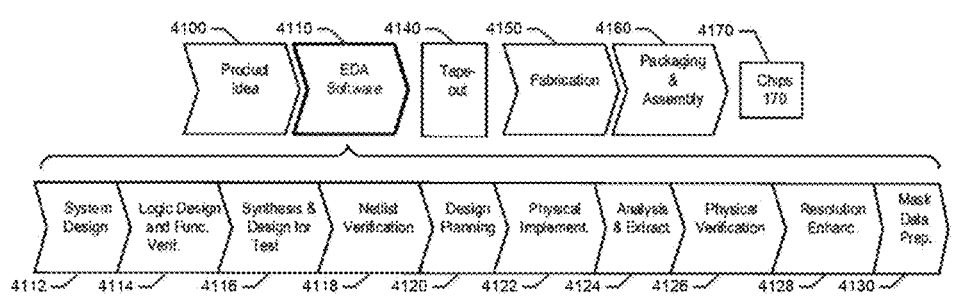

FIG. 41 depicts simplified exemplary steps in the design and fabrication of an integrated circuit.

DETAILED DESCRIPTION

Some example embodiments will now be described more fully hereinafter with reference to the accompanying drawings, in which some, but not all embodiments are shown.

Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

Goal and Cost Function

Embodiments of the present invention are directed to solving the problem of differential group pattern match routing. In some embodiments, the goal is to find good merge point so that a matching part (or portion) of the signals is as long as possible and the routing distance variation of the diverged part is as small as possible.

For example, the optimization cost may be defined as:

$$\text{cost} = \text{merging part length} * \alpha + \text{diverged part length} * \beta + \text{variation of diverged part length} * \gamma$$

where $\alpha$, $\beta$, and $\gamma$ are controllable weighting factors. And in this function, the impact of variation of diverged part length*$\gamma$ should be larger than diverged part length*$\beta$, and the impact of diverged part length*$\beta$ should also be larger than merging part length*$\alpha$. For example, we might want to set the proportion of (merging part length*$\alpha$):(diverged part length*$\beta$):(variation of diverged part length*$\gamma$)$\approx$1:2:4.

Embodiments shown herein describe a process to set $\alpha$, $\beta$, and $\gamma$ to achieve this proportion, for example, using FIG. 11. First, the distance between the center points of two groups of pins may be defined as x, and the width and height of the bounding box of bump pins may be defined as y and z. Thus, the merging part length has a positive relation to x, and the diverged part length has a positive relation to $$\frac{y+z}{2}.$$

(Note mat variation of diverged part length does not have special relation to the pin distance.) Subsequently, to achieve (merging part length*$\alpha$):(diverged part length*$\beta$):(variation of diverged part length*$\gamma$)$\approx$1:2:4, the following variables are set:

$$\alpha = \frac{1}{x^1}, \beta = 2 * \frac{2}{y+z} t,$$

and $\gamma = 4$ (constant).

And thus, embodiments shown herein are able to identify merging points such that the cost of the routing result is minimized.

Algorithm

Instead of randomly trying different locations as merge points and calculating the cost of each result, in some embodiments described herein, an apparatus, for example, may be configured to divide the space into two categories:

1. Outer merge point, which is defined as the points located outside around the bounding box of the pins and the routing direction is toward inside the bounding box. 2. Inner merge point, which is defined as the points located inside the bounding box of the pins and each inner merge point has four different routing directions associate with it. For example, the cross points in FIG. 12 are outer merge points, the star points are the inner merge points and the arrows are the routing directions. In some embodiments, points away from the bounding box may be ignored, not considered, or otherwise removed from consideration, since the merging part length of these solutions will be shorter than points just around the bounding box, and as such, these points will never be the optimal solution.

If we try to route each merge point one by one, the runtime is O(# of merge points). However, not all merge points are feasible solution. Instead of trying all merging points directly by routing, which will cause a lot of runtime, embodiments described herein show that by using a routability determination method, some of the merging points may be waved in the early stage due to an expected detour routing result.

Generally, in some embodiments, an algorithm may comprise: 1. Get all merge point candidates; 2. Use routability determination to waive the candidates which have detour routing result; 3. Try routing outer merge points and calculate cost; and 4. Try routing inner merge points and calculate cost; 5. Keep best result.

FIG. 13 is a flowchart showing an exemplary method of operating an example apparatus, for example, apparatus 4000 described below with reference to FIG. 40, performed in accordance with an embodiment of the present invention. Specifically FIG. 13 shows an example method for differential group pattern match routing.

As shown in block 1305 of FIG. 13, the apparatus 4000 may be configured to identify each of a plurality of merge point candidates. The apparatus may therefore include means, such as the processor 4010, the communication interface 4030 or the like, for identifying each of a plurality of merge point candidates.

As shown in block 1310 of FIG. 13, the apparatus 4000 may be configured to remove, for example, from consideration, any merge point candidate located away from bounding box. The apparatus may therefore include means, such as the processor 4010, the communication interface 4030 or the like, for removing from consideration any merge point candidate located away from bounding box.

As shown in block 1315 of FIG. 13, the apparatus 4000 may be configured to perform a routability determination, the results of the routability determination comprising a remaining subset of the plurality of merge point candidates. The apparatus may therefore include means, such as the processor 4010, the communication interface 4030 or the like, for performing a routability determination, the results of the routability determination comprising a remaining subset of the plurality of merge point candidates.

In some embodiments, a routability determination process may comprise filtering out the monotonic unroutable merge points, for example, by checking each combination bounding boxes of two nets. For outer merge points, if the bounding boxes of two nets do not overlap, the apparatus may be configured to determine that the two nets can be both routed monotonically, and if the bounding boxes of two nets do overlap, the apparatus may be configured to determine whether the two nets can both be routed monotonically in accordance with a table that identifies each of six combinations of overlap. The table is described in more detail below with reference to FIG. 16. For inner merge points, the apparatus may be configured for determining that the two nets cannot be both routed monotonically only when the bounding boxes of the two nets cross each other.

As described above, an outer merge point is defined as a point located outside the bounding box of the pins and wherein the routing direction is toward the bounding box and an inner merge point is defined as a point located inside the bounding box of the pins wherein each inner merge point has four different routing directions associate with it. The routability determination process is described below under the heading "routability determination", which describes the algorithm for routability determination.

As shown in block 1320 of FIG. 13, the apparatus 4000 may be configured to route each remaining merge point from the remaining subset of the plurality of merge point candidates. The apparatus may therefore include means, such as the processor 4010, the communication interface 4030 or the like, for routing each remaining merge point from the remaining subset of the plurality of merge point candidates.

As shown in block 1325 of FIG. 13, the apparatus 4000 may therefore be configured to calculate a routing cost for each remaining merge point from the remaining subset of the plurality of merge point candidates. The apparatus may therefore include means, such as the processor 40102, the communication interface 4030 or the like, for calculating a routing cost for each remaining merge point from the remaining subset of the plurality of merge point candidates.

In some embodiments, calculating the routing cost for each remaining merge point may comprise calculating a cost for each remaining outer merge point from the remaining subset of the plurality of merge point candidates and calculating a cost of each remaining inner merge point from the remaining subset of the plurality of merge point candidates.

In some embodiments, calculation is performed by utilizing a cost function. For example, in some embodiments, the cost function is $$cost = a \text{ merging part length}*\alpha + a \text{ diverged part length}*\beta + a \text{ variation of diverged part length}*\gamma$$

wherein $\alpha$, $\beta$, and $\gamma$ are controllable weighting factors. In some embodiments, the cost function is characterized in that an impact of a variation of the diverged part length*$\gamma$ is larger than diverged part length*$\beta$, and the impact of diverged part length*$\beta$ is larger than merging part length*$\alpha$. In some embodiments, a distance between a center point of two groups of pins is defined as x, and a width and a height of a bounding box of bump pins is defined as y and z, thus the merging part length has a positive relation to x and the diverged part length has a positive relation to (y+z)/2.

As shown in block 1330 of FIG. 13, the apparatus 4000 may be configured to determine a merge point having a lowest calculated cost. The apparatus may therefore include means, such as the processor 4010, the communication interface 4030 or the like, for determining a merge point having a lowest calculated cost.

Routability Determination

As can be seen in from the example in FIG. 6, if detour routing exists for some net in the group, then the route length variation is larger. Thus, in order to minimize the final cost, detour should be prevented. Furthermore, if the nets are routed monotonically inside the bounding box, then there will be no detour in the routing. As can be seen in from the example in FIG. 14, the left two routing are non-monotonic and will result in detour; and right most routing is monotonic and no detour occurs.

When routing more than one net together in an area, the best way to increase the total routability is to route all nets in the same direction: clockwise or counter-clockwise along the routing area. FIG. 15 shows an exemplary embodiment using clockwise as the direction, though the method will also work when routing all nets counter-clockwise.

As described above, in the routability determination process, the monotonic routability may be determined for two nets. In an instance in which the bounding boxes of two nets do not overlap, it can be determined that these two nets can be both routed monotonically. In some instances, however, the bounding boxes for two nets do overlap.

For those cases of outer merge points, the starting points can be defined as line up points at the merge position. So the first condition is where the starting point of net b falls inside of the bounding box of net a, the bounding boxes correlation can be divided into six cases, as shown in FIG. 16 and FIG. 17. The six cases are:
1. The ending points of net b lies at the upper left of the bounding box of net a.
2. The ending points of net b lies at the middle left of the bounding box of net a.
3. The ending points of net b lies at the middle up of the bounding box of net a.
4. The ending points of net b lies at the inside of the bounding box of net a.
5. The ending points of net b lies at the upper right of the bounding box of net a.
6. The ending points of net b lies at the middle right of the bounding box of net a.

And for the cases of outer merge points, where the starting point of net b falls outside of the bounding box of net a, the analysis result is shown in FIG. 18.

Using these analysis results, for a merge point candidate, the routability can be identified quickly by checking all the combinations of the bounding box of two nets from the net group by the look up table. So the runtime of the routability determination is $O((\# \text{ of nets})^2)$.

For the routability determination of inner merge points, the mechanism is similar. In some embodiments, a routing policy may still route all nets clockwise. In some embodiments, a difference may be that the starting points of the nets in the middle needs to be higher than the neighbor nets in order to route all conditions, as shown in FIG. 19. The routability determination may be much simpler for inner merge point cases. That is, in some embodiments, only when the bounding boxes of the two nets cross each other (e.g., a cross sign), is it determined that it is an unroutable case for monotonic routing, for example, as shown in FIG. 20.

Routing

After the routability determination in which the merge point candidates are analyzed, embodiments described herein enable routing, for example, using all the routable merge points and calculating the cost of each result. Then the optimal routing solution can be found.

EXAMPLE

Given a different group pattern match routing of five nets, where the net assignment is shown as FIG. 21.

First each of the matching point candidates may be found, for example, as shown in FIG. 22. Next, the apparatus may be configured to perform a routability determination for all merge points. For example, the routability determination passes for the merge point shown in FIG. 23, whereas the routability determination fails for merge point as shown in FIG. 24, due to the bounding box pair in FIG. 25. Similarly, the routability determination fails for the merge point shown in FIG. 26, due to the bounding box pair in FIG. 27.

After all merge points are checked by the routability determination process, each of the remaining (e.g., routable) merge points may be routed and the cost of each route may be calculated, for example, using the cost function. The routing results of some merge points are shown in FIG. 28. In one exemplary embodiment, as shown in FIG. 28, based on the calculated cost, the optimal solution is in the upper left.

Additional Examples

In the examples described above, the IO pins were lined up in a row, such that the merge point for the IO pins is identified in a very straight forward manner. However, embodiments described herein may be utilized in those exemplary cases where both side of pins are not placed in lines.

The algorithm described above may be applied, for example, such that the apparatus is configured to:
1. get possible order of one side
2. get possible order of another side
3. find the intersections of possible orders in step 1 and step 2.
4. Set a middle point between the two groups as the routing start point for both groups and apply every routing order from step 3.
5. try to route both sides using former algorithm
6. Calculate the cost of each side and keep the solution with the minimum total cost of both sides.

For example, first a determination may be made regarding the order when the bump pins are placed non-linearly. That is, instead of trying each of a plurality of combinations randomly, embodiments of the present invention may be configured to use constraint graph that reduce the number of net order candidates. For example, in FIG. 31, there are eight bump pins in a group which need to be routed to the right hand side.

First, an interval may be chosen as the outgoing point at this side. For example, as shown in FIG. 32, the second interval at the right hand side of the bounding box is chosen as the outgoing point.

Then, the routing space is divided, for example, into two parts. The routing to the bump pins located in the upper part should only be inside the upper pin bounding box, otherwise it will become a detour solution, and the cost of this solution will be high. Second, we analyze the location of the bump pins in each part and build the constraint graph by the locations. In this example, the bump pins of net28 and net29 are located in the same row and the bump pin of net28 is at the right hand side of the bump pin of net29, and the outgoing point is at the right of the bounding box. If the routing order is to connect net28 to a lower point then net29, then it is an unroutable order, as shown in FIG. 33. In other words, a routable order is to have the connect point of net28 higher than the connect point of net29, as shown in FIG. 34. By this concept, we build a constraint graph of node net28 with an edge towards node net29, as shown in FIG. 35.

And the bump pins of net28 and net30 are in the same column, where the bump pin of net28 is upper than the bump pin of net30. Using similar analysis, we get the result that net28 also need to connect to a higher point than net30. So the updated constraint graph is shown in FIG. 36.

From the constraint graph, the nodes with degree-0 connect first to the highest points. And then, we can remove the degree-0 nodes from the graph, and repeat the process to build the routing order for the upper part.

By using the constraint graph, the routing order candidates for the upper part are reduced to only two sequences: net28, net29, net30 and net28, net30, net29, as shown in FIG. 37. Then we can build the constraint graph for the lower part and reduce the routing order candidates for the lower part, as shown in FIG. 38.

The final routing order candidates for this interval are the combination result of the sequence of the upper part and the lower part, as shown in FIG. 39. And each different interval will also introduce different routing order candidates.

The routing order of the other side can be also determined by building the constraint graph. The final routing is then to find the common routing order of both sides, and apply the former algorithm to try route and calculate the cost.

Conclusion

As described above, embodiments of the present invention include a differential group pattern match routing algorithm by a good entry finder method. Instead of trying to route blindly, all possible merge points around and inside the pin bounding box may be determined and the monotonic unroutable merge points may be filtered out by a routability determination process very quickly. The remaining merge points may then be routed one by one and the cost of each is calculated, for example, by the cost function:

cost=merging part length*α+diverged part length*β+ variation of diverged part length*γ where α, β, and γ are controllable weighting factors. The routing result always keeps the routing solution with the smallest cost during routing, and the final solution is the optimal solution.

Embodiments of the present invention provide a controllable cost function for the differential group pattern match routing problem, and identifies the monotonic solution, if one exists. Some embodiments also provide a routability determination process for merge points which can reduce solution space and save the runtime.

For complicated cases, for example, where both sides of the routing pins are placed non-linearly (e.g., not placed in a single row or column), embodiments of the present invention provide a constraint graph method to reduce the possible routing orders.

Accordingly, optimal differential group pattern match routing results may be found effectively and efficiently.

Exemplary Apparatus

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or application specific integrated circuit for a mobile phone or a similar integrated circuit in a server, a cellular network device, or other network device.

FIG. 40 is a block diagram of a computer system that may incorporate embodiments of the present invention. FIG. 40 is merely illustrative of an embodiment incorporating the present invention and does not limit the scope of the invention as recited in the claims. One of ordinary skill in the art would recognize other variations, modifications, and alternatives.

In one embodiment, computer system 4000 typically includes a monitor 4010, a computer 4020, user output devices 4030, user input devices 4040, communications interface 4050, and the like.

As shown in FIG. 40, computer 4020 may include a processor(s) 4060 that communicates with a number of peripheral devices via a bus subsystem 4090. These peripheral devices may include user output devices 4030, user input devices 4040, communications interface 4050, and a storage subsystem, such as random access memory (RAM) 4070 and disk drive 4080.

User input devices 4030 include all possible types of devices and mechanisms for inputting information to computer system 4020. These may include a keyboard, a keypad, a touch screen incorporated into the display, audio input devices such as voice recognition systems, microphones, and other types of input devices. In various embodiments, user input devices 4030 are typically embodied as a computer mouse, a trackball, a track pad, a joystick, wireless remote, drawing tablet, voice command system, eye tracking system, and the like. User input devices 4030 typically allow a user to select objects, icons, text and the like that appear on the monitor 4010 via a command such as a click of a button or the like.

User output devices 4040 include all possible types of devices and mechanisms for outputting information from computer 4020. These may include a display (e.g., monitor 4010), non-visual displays such as audio output devices, etc.

Communications interface 4050 provides an interface to other communication networks and devices. Communications interface 4050 may serve as an interface for receiving data from and transmitting data to other systems. Embodiments of communications interface 4050 typically include an Ethernet card, a modem (telephone, satellite, cable, ISDN), (asynchronous) digital subscriber line (DSL) unit, FireWire interface, USB interface, and the like. For example, communications interface 4050 may be coupled to a computer network, to a FireWire bus, or the like. In other embodiments, communications interfaces 4050 may be physically integrated on the motherboard of computer 4020, and may be a software program, such as soft DSL, or the like.

In various embodiments, computer system 4000 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiment, computer 4020 includes one or more Xeon microprocessors from Intel as processor(s) 4060. Further, one embodiment, computer 4020 includes a UNIX-based operating system.

RAM 4070 and disk drive 4080 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, non-transitory read-only-memories (ROMS), battery-backed volatile memories, networked storage devices, and the like. RAM 4070 and disk drive 4080 may be configured to store the basic programming and data constructs that provide the functionality of the present invention.

Software code modules and instructions that provide the functionality of the present invention may be stored in RAM 4070 and disk drive 4080. These software modules may be executed by processor(s) 4060. RAM 4070 and disk drive 4080 may also provide a repository for storing data used in accordance with the present invention.

RAM 4070 and disk drive 4080 may include a number of memories including a main random access memory (RAM) for storage of instructions and data during program execution and a read only memory (ROM) in which fixed non-transitory instructions are stored. RAM 4070 and disk drive 4080 may include a file storage subsystem providing persistent (non-volatile) storage for program and data files. RAM 4070 and disk drive 4080 may also include removable storage systems, such as removable flash memory.

Bus subsystem 4090 provides a mechanism for letting the various components and subsystems of computer 4020 communicate with each other as intended. Although bus subsystem 4090 is shown schematically as a single bus, alternative embodiments of the bus subsystem may utilize multiple busses.

FIG. 40 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of the present invention can be implemented in the form of logic in software or hardware or a combination of both. The logic may be stored in a computer readable or machine-readable non-transitory storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

The above embodiments of the present invention are illustrative and not limiting. Various alternatives and equivalents are possible. Although, the invention has been described with reference to a triple-patterning technology using three colors for validation by way of an example, it is understood that the invention is not limited by the triple-patterning technology but may also be applicable to higher than triple-patterning technologies such as technologies using more than three colors during validation. Although, the invention has been described with reference to an exemplary process for manufacturing certain integrated circuit transistor components by way of an example, it is understood that the invention is not limited by the type of process nor the type of transistor components so long as the process of components may benefit from the use of a triple-patterning or higher-patterning technology. In addition, the technique and system of the present invention is suitable for use with a wide variety of electronic design automation (EDA) tools and methodologies for designing, testing, and/or manufacturing systems characterized by a combination of conserved, signal flow, and event or digital system of equations. The scope of the invention should, therefore, be determined not with reference to the above description, but instead should be determined with reference to the pending claims along with their full scope or equivalents.

FIG. 41 depicts simplified exemplary steps in the design and fabrication of an integrated circuit. The process starts with a product idea 4100, which is realized using Electronic Design Automation (EDA) software 4110. Chips 4170 can be produced from the finalized design by performing fabrication 4150 and packaging and assembly 4160 steps. An exemplary design flow that uses EDA software 110 is described below for illustration purposes only. For example, an actual integrated circuit design may require a designer to perform the design flow steps in a different sequence than the sequence described below.

In the system design 4112, a designer describes the functionality to be implemented. The designer can also perform what-if planning to refine the functionality and to check costs. Further, hardware-software architecture partitioning can occur at this step. In the design and functional verification 4114, a Hardware Description Language (HDL) design may be created and checked for functional accuracy.

In the synthesis and design 4116, the HDL code can be translated to a netlist, which can be optimized for the target technology. Further, tests can be designed and implemented to check the finished chips. In the netlist verification 4118, the netlist can be checked for compliance with timing constraints and for correspondence with the HDL code. In the design planning 4120, an overall floor plan for the chip can be constructed and analyzed for timing and top-level routing. Next, in the physical implementation 4122, placement and routing can be performed.

In the analysis and extraction 4124, the circuit functionality can be verified at a transistor level. In the physical verification 4126, the design can be checked to correct any functional, manufacturing, electrical, or lithographic issues. In the resolution enhancement 4128, geometric manipulations can be performed on the layout to improve manufacturability of the design. Finally, in the mask data preparation 4130, the design can be taped-out 4140 for production of masks to produce finished chips. The embodiments of the present invention may be used, for example at the steps of either physical verification 4126 and/or mask data preparation 4130.

FIG. 13, described above, illustrates an example flowchart of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 4070 or 4080 of an apparatus employing an embodiment of the present invention and executed by a processor 4060 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 13, when executed, convert a computer or processing circuitry into a particular machine configured to perform an example embodiment of the present invention. Accordingly, the operations of FIG. 13 define an algorithm for configuring a computer or processing to perform an example embodiment. In some cases, a general purpose computer may be provided with an instance of the processor which performs the algorithms of FIG. 13 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for determining an entry finder from a plurality of merge points of a bounding box for an optimal performance of a differential group pattern match routing, the method comprising:
   identifying each merge point candidate of a plurality of merge point candidates;
   performing a routability determination process, results of the routability determination process comprising a remaining subset of the plurality of merge point candidates;
   routing each remaining merge point from the remaining subset of the plurality of merge point candidates;
   calculating a routing cost for each remaining merge point from the remaining subset of the plurality of merge point candidates; and
   determining a merge point having a lowest calculated routing cost.

2. The method of claim 1, further comprising: removing from consideration any merge point candidate located away from the bounding box.

3. The method of claim 1, wherein the routability determination process comprises filtering out the merge points that are monotonically un-routable by:
   for each combination of bounding boxes of two nets,
   wherein for outer merge points, if the bounding boxes of two nets do not overlap, determining that the two nets can be both routed monotonically, and if the bounding boxes of two nets do overlap, determining whether the two nets can both be routed monotonically in accordance with a table that identifies each of six combinations of overlap, and
   wherein for inner merge points, determining that the two nets cannot be both routed monotonically only when the bounding boxes of the two nets cross each other.

4. The method of claim 1, wherein the calculating a routing cost for each remaining merge point comprises:
   calculating a cost for each remaining outer merge point from the remaining subset of the plurality of merge point candidates; and
   calculating a cost of each remaining inner merge point from the remaining subset of the plurality of merge point candidates.

5. The method of claim 4,
   wherein an outer merge point is defined as a point located outside a bounding box of pins and wherein a routing direction is toward the bounding box, and
   wherein an inner merge point is defined as a point located inside the bounding box of the pins wherein each inner merge point has four different routing directions associate with said each inner merge point.

6. The method of claim 4, wherein the routing cost is defined as:

$$\text{routing cost} = \text{a merging part length}*\alpha + \text{a diverged part length}*\beta + \text{a variation of diverged part length}*\gamma$$

wherein $\alpha$, $\beta$, and $\gamma$ are controllable weighting factors.

7. The method of claim 6, wherein an impact of a variation of the diverged part length*$\gamma$ is larger than an impact of diverged part length*$\beta$, and the impact of diverged part length*$\beta$ is larger than an impact of merging part length*$\alpha$.

8. The method of claim 7, wherein a distance between a center point of two groups of pins is defined as x, and a width and a height of a bounding box of bump pins is defined as y and z, thus the merging part length has a positive relation to x and the diverged part length has a positive relation to (y+z)/2.

9. An apparatus for determining an entry finder from a plurality of merge points of a bounding box for an optimal performance of a differential group pattern match routing, the apparatus comprising at least one processor and at least one memory including computer program code, the at least one memory and the computer program code configured to, with the processor, cause the apparatus to execute at least:
   identifying each merge point candidate of a plurality of merge point candidates;
   performing routability determination process, results of the routability determination process comprising a remaining subset of the plurality of merge point candidates;
   routing each remaining merge point from the remaining subset of the plurality of merge point candidates;
   calculating a routing cost for each remaining merge point from the remaining subset of the plurality of merge point candidates; and
   determining a merge point having a lowest calculated routing cost.

10. The apparatus of claim 9, wherein the at least one memory and the computer program code are further configured to, with the processor, cause the apparatus to: remove from consideration any merge point candidate located away from the bounding box.

11. The apparatus of claim 9, wherein the computer program code configured to perform the routability determination process further comprises computer program code configured with the processor to cause the apparatus to filter out the merge points that are monotonically un-routable by:
for each combination of bounding boxes of two nets,
wherein for outer merge points, if the bounding boxes of two nets do not overlap, determining that the two nets can be both routed monotonically, and if the bounding boxes of two nets do overlap, determining whether the two nets can both be routed monotonically in accordance with a table that identifies each of six combinations of overlap, and
wherein for inner merge points, determining that the two nets cannot be both routed monotonically only when the bounding boxes of the two nets cross each other.

12. The apparatus of claim 9, wherein the calculating a routing cost for each remaining merge point comprises:
calculating a cost for each remaining outer merge point from the remaining subset of the plurality of merge point candidates; and
calculating a cost of each remaining inner merge point from the remaining subset of the plurality of merge point candidates.

13. The apparatus of claim 12,
wherein an outer merge point is defined as a point located outside a bounding box of bump pins and wherein a routing direction is toward the bounding box, and
wherein an inner merge point is defined as a point located inside the bounding box of the pins wherein each inner merge point has four different routing directions associate with said each inner merge point.

14. The apparatus of claim 12, wherein the routing cost is defined as:

routing cost=a merging part length*α+a diverged part length*β+a variation of diverged part length*γ wherein α, β, and γ are controllable weighting factors.

15. The apparatus of claim 14, wherein an impact of a variation of the diverged part length*γ is larger than an impact of diverged part length*β, and the impact of diverged part length*β is larger than an impact of merging part length*α.

16. The apparatus of claim 15, wherein a distance between a center point of two groups of pins is defined as x, and a width and a height of a bounding box of bump pins is defined as y and z, thus the merging part length has a positive relation to x and the diverged part length has a positive relation to (y+z)/2.

17. A computer program product for determining an entry finder from a plurality of merge points of a bounding box for an optimal performance of a differential group pattern match routing, the computer program product comprising at least one non-transitory computer-readable storage medium having computer-executable program code instructions stored therein, the computer-executable program code instructions comprising program code instructions for:
identifying each merge point candidate of a plurality of merge point candidates;
performing a routability determination process, results of the routability determination process comprising a remaining subset of the plurality of merge point candidates;
routing each remaining merge point from the remaining subset of the plurality of merge point candidates;
calculating a routing cost for each remaining merge point from the remaining subset of the plurality of merge point candidates; and
determining a merge point having a lowest calculated routing cost.

18. The computer program product of claim 17, wherein the computer-executable program code instructions further comprise program code instructions for: removing from consideration any merge point candidate located away from the bounding box.

19. The computer program product of claim 17, wherein the routability determination process comprises filtering out the merge points that are monotonically un-routable by:
for each combination of bounding boxes of two nets,
wherein for outer merge points, if the bounding boxes of two nets do not overlap, determining that the two nets can be both routed monotonically, and if the bounding boxes of two nets do overlap, determining whether the two nets can both be routed monotonically in accordance with a table that identifies each of six combinations of overlap, and
wherein for inner merge points, determining that the two nets cannot be both routed monotonically only when the bounding boxes of the two nets cross each other.

20. The computer program product of claim 17, wherein the calculating a routing cost for each remaining merge point comprises:
calculating a cost for each remaining outer merge point from the remaining subset of the plurality of merge point candidates; and
calculating a cost of each remaining inner merge point from the remaining subset of the plurality of merge point candidates.

21. The computer program product of claim 20,
wherein an outer merge point is defined as a point located outside a bounding box of pins and wherein a routing direction is toward the bounding box, and
wherein an inner merge point is defined as a point located inside the bounding box of the pins wherein each inner merge point has four different routing directions associate with said each inner merge point.

22. The computer program product of claim 20, wherein the routing cost is defined as:

routing cost=a merging part length*α+a diverged part length*β+a variation of diverged part length*γ wherein α, β, and γ are controllable weighting factors.

23. The computer program product of claim 22, wherein an impact of a variation of the diverged part length*γ is larger an impact of than diverged part length*β, and the impact of diverged part length*β is larger than an impact of merging part length*α.

24. The computer program product of claim 23, wherein a distance between a center point of two groups of pins is defined as x, and a width and a height of a bounding box of bump pins is defined as y and z, thus the merging part length has a positive relation to x and the diverged part length has a positive relation to (y+z)/2.

* * * * *